United States Patent
Liardet

(10) Patent No.: US 7,254,600 B2
(45) Date of Patent: Aug. 7, 2007

(54) MASKING OF FACTORIZED DATA IN A RESIDUE NUMBER SYSTEM

(75) Inventor: Pierre-Yvan Liardet, Peynier (FR)

(73) Assignee: STMicroelectronics S.A., Montrouge (FR)

( * ) Notice: Subject to any disclaimer, the term of this patent is extended or adjusted under 35 U.S.C. 154(b) by 668 days.

(21) Appl. No.: 10/665,801

(22) Filed: Sep. 18, 2003

(65) Prior Publication Data

US 2004/0059767 A1 Mar. 25, 2004

(30) Foreign Application Priority Data

Sep. 20, 2002 (FR) .................... 02 11671

(51) Int. Cl.
*G06F 7/72* (2006.01)

(52) U.S. Cl. ..................................... 708/491

(58) Field of Classification Search ................. 708/491
See application file for complete search history.

(56) References Cited

U.S. PATENT DOCUMENTS

| | | | | |
|---|---|---|---|---|
| 5,974,151 | A * | 10/1999 | Slavin | .......................... 380/30 |
| 5,991,415 | A | 11/1999 | Shamir | |
| 6,304,658 | B1 | 10/2001 | Kocher et al. | |
| 2001/0002486 | A1 | 5/2001 | Kocher et al. | |
| 2002/0124178 | A1 | 9/2002 | Kocher et al. | |
| 2003/0028771 | A1 | 2/2003 | Kocher et al. | |

FOREIGN PATENT DOCUMENTS

FR 2799851 A 4/2001

OTHER PUBLICATIONS

French Search Report from corresponding French priority application No. 02/11671.
Bajard, J-C, et al., *Modular Multiplication and Base Extensions in Residue Number Systems*, Proceedings 15th IEEE Symposium on Computer Arithmetic. Vail. Co, Jun. 11-13, 2001, IEEE Symposium on Computer Arithmetic, US, Los Alamitos, IEEE Comp. Soc. Jun. 11, 2001, pp. 59-65, XP-010547810.
Yens, M. et al., *RSA Speedup with Residue Number System Immune Against Hardware Fault Cryptanalysis*, Lecture Notes in Computer Science, Springer Verlag, New York, NY vol. 2288, Dec. 7, 2001, pp. 397-413, XP002233842.

* cited by examiner

*Primary Examiner*—D. H. Malzahn
(74) *Attorney, Agent, or Firm*—Lisa K. Jorgenson; James H. Morris; Wolf, Greenfield & Sacks, P.C.

(57) ABSTRACT

A method and a circuit for masking digital data handled by an algorithm and factorized by a residue number system based on a finite base of numbers or polynomials prime to one another, comprising making the factorization base variable.

16 Claims, 1 Drawing Sheet

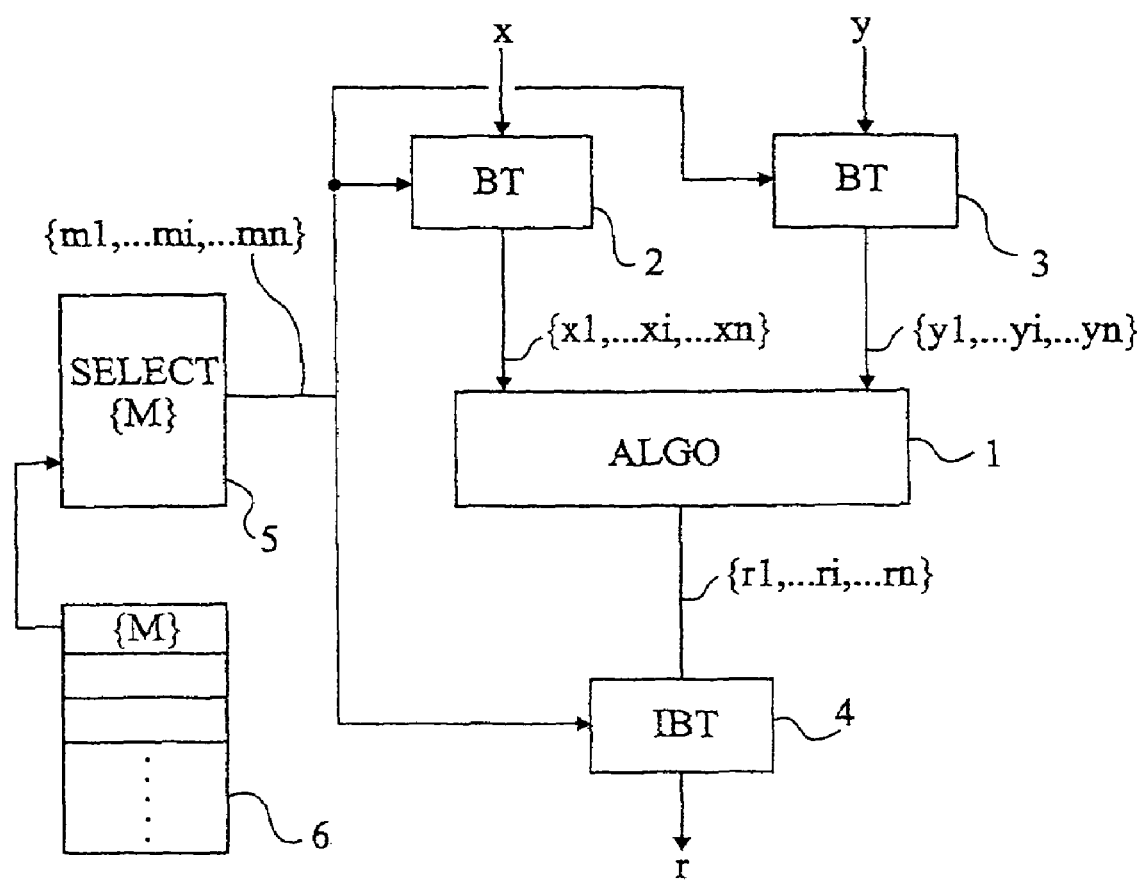

MASKING OF FACTORIZED DATA IN A RESIDUE NUMBER SYSTEM

BACKGROUND OF THE INVENTION

1. Field of the Invention

The present invention relates to algorithmic processings performed on digital data handled by a microprocessor or an integrated circuit. The present invention more specifically relates to processings performed on digital data in cryptographic cyphering or authentication applications implementing so-called secured algorithms. In such applications, the data handled by the algorithms and on which basic operations (additions, multiplications) are performed must be protectable against piracy, that is, against external attacks aiming at discovering secret data and/or the calculation algorithm.

2. Discussion of the Related Art

For example, when an integrated circuit (be it a microprocessor or an operator in wired logic) executes a calculation on data, this calculation has an influence upon its power consumption. An analysis of the power consumption of the integrated circuit during the algorithm execution may enable a pirate to discover the processed data or the algorithm which executes them. Such attacks by analysis of the power consumption of an integrated circuit handling data are known as the SPA (single power analysis) or the DPA (differential power analysis).

An example of application of the present invention relates to authentication procedures of digital files (for example, audio files) or of electronic processing elements (for example, smart cards) to validate the authorization of the user to have access to information (for example, audio data or on-chip data).

For questions of calculation rapidity and of algorithm implementation ease, the numbers on which operations are desired to be performed by automatic calculation means may be factorized by application of the so-called Chinese remainder theorem (CRT).

The Chinese remainder theorem, applied to integers, may be expressed as follows. For any sequence of numbers $m_i$ (i ranging between 1 and n) prime to one another and for any sequence of integers $x_i$, there is a single integer x smaller than the product of the sequence of prime numbers of the factorization base, such that for any i:

$$x_i = x \text{ modulo } m_i.$$

This means that, for a finite sequence of numbers $m_i$, prime to one another, any number smaller than the product of this finite sequence can be represented uniquely, in a sequence of positive integers in a number equal to the number of elements of the sequence of numbers prime to one another. This representation is called the residue number system (RNS) representation.

In other words, for any integer x between 0 and M, where M represents the product of prime numbers $m_i$ of the factorization base, one may write:

$$x = \left| \sum_{i=1}^{n} x_i \cdot M_i \cdot |M_i^{-1}|_{m_i} \right|_M, \quad \text{(formula 1)}$$

with $M = \prod_{i=1}^{n} m_i$, $M_i = \dfrac{M}{m_i}$, and where $|M_i^{-1}|_{m_i}$ is the inverse of number $M_i$ modulo $m_i$. Notation $|\ldots|_M$ is used to designate a number (here, the result of the sum) modulo M.

The advantage of residue number systems is that operations such as addition, subtraction, and multiplication are simplified and can be executed in parallel architectures. In fact, the elementary operations can be performed on each integer of the factorization of the number to be calculated. The result is then obtained by applying above formula 1 to the result.

For example, two numbers x and y on which a calculation is desired to be performed are factorized by using the same base of prime numbers. After, the addition, subtraction, and product operations are carried out on the elements of the factorization, modulo the corresponding prime numbers. A set of values is obtained in the factorization base, which are recombined to obtain the result.

The major advantage of an automated execution of the calculations by means of integrated circuits is that the individual operations modulo the numbers of the factorization base involve numbers always having the same size, which enables execution of these calculations by means of parallel architectures and within a same duration.

However, a disadvantage is that the processed numbers are more easily detectable by the different attacks, especially, by power analysis of the integrated circuit.

Conventionally, to mask the processing of one or several numbers, these numbers are combined with random quantities, before the algorithmic processing.

A disadvantage is that this modifies the processed number(s), which imposes performing a reverse modification at the end of the processing to recover the expected result.

Another disadvantage is that the masking increases the processing complexity as well as the duration of the full calculation.

More generally, the residue number system applying the Chinese remainder theorem applies when the operations and operands are those of any finite body. For example, this system applies to a body of polynomials modulo an irreducible polynomial, or to the body of integers modulo a prime number.

SUMMARY OF THE INVENTION

The present invention aims at providing a solution for masking the execution of algorithmic calculations using representations by residue number system.

The present invention more specifically aims at providing a masking solution which is independent from the implemented algorithm, that is, which can apply whatever the calculations performed on the factorized numbers.

The present invention also aims at providing a solution which does not adversely affect the execution rapidity of the algorithm and, especially, which adds no additional calculation step.

To achieve these and other objects, the present invention provides a method for masking digital data handled by an algorithm and factorized by a residue number system based on a finite base of numbers or polynomials prime to one another, comprising making the factorization base variable.

According to an embodiment of the present invention, the factorization base is chosen from a look-up table of sets of numbers or polynomials prime to one another.

According to an embodiment of the present invention, the set of numbers or polynomials prime to one another used for the factorization by residue number system is randomly selected from the look-up table, for each new application of the algorithm.

According to an embodiment of the present invention, the factorization base is calculated by a pseudo-random generator.

According to an embodiment of the present invention, the base is chosen to be compatible with the lengths of the numbers or polynomials processed by the algorithm.

According to an embodiment of the present invention, the method is applied to input data already factorized by a residue number system in an original base, the input data undergoing a factorization base change and the result provided by the algorithm undergoing, preferably, an inverse transformation towards said original base.

According to an embodiment of the present invention, the method is applied to input data not yet factorized.

According to an embodiment of the present invention, one or several factorization base changes are performed during the execution of the algorithm.

The present invention also provides a circuit of algorithmic processing of data factorized by a residue number system based on a finite base of numbers or polynomials prime to one another, comprised of a circuit of selection or generation, and of temporary storage of said base.

According to an embodiment of the present invention, the circuit comprises an element for storing a table of bases of numbers or polynomials prime to one another, said selection circuit selecting, at each application of the algorithm, a base from said table.

According to an embodiment of the present invention, the circuit comprises an element for checking the conformity between the base selected for application of the factorizations by residue number system and the calculation circuits of the circuit executing the algorithm.

The foregoing objects, features, and advantages of the present invention will be discussed in detail in the following non-limiting description of specific embodiments in connection with the accompanying drawing which very schematically illustrates in the form of blocks an embodiment of the masking method according to the present invention.

BRIEF DESCRIPTION OF THE DRAWINGS

FIG. 1 is a schematic diagram illustrating an embodiment of the masking method according to the present invention.

DETAILED DESCRIPTION

For clarity, the present invention will be discussed hereafter in relation with an application to integers factorized based on a base of numbers prime to one another. It should however be noted that it more generally applies to a factorization of polynomials of a body modulo an irreducible polynomial based on a base of polynomials prime to one another.

A feature of the present invention is to modify the factorization/recombination base of the integers processed by an algorithm in application of a residue number system.

According to the present invention, the representation by the residue number system is changed, preferably, each time a new group of integers is submitted to a factorization for an algorithmic processing, or for a calculation operation.

Thus, conversely to conventional solutions of calculation masking by introduction of random numbers in the processed numbers to modify them, the present invention provides making the number representation variable, said number remaining unchanged.

A significant advantage as compared to the introduction of a random number is that the recovery of the expected result requires no additional calculation with respect to the conventional application of residue number system representations. Indeed, only the factorization base must be indicated to the conventional recombination process. In other words, the factorization base is made variable.

Another advantage is that the calculation duration is only slightly increased by the masking. The only additional duration corresponds to the factorization base change (memory reading), which is negligible as compared to the additional calculations required, at least at the beginning and at the end of an algorithm, to combine the processed numbers (or polynomials) with a random number.

The appended drawing shows, in the form of blocks, an example of application of a residue number system representation to an algorithm 1 (ALGO) intended to process, for example, at least two integers x and y and provide at least one result r.

As previously, to ease calculations, algorithm 1 executes elementary operations on each element of factorizations $\{x_1, \ldots x_i, \ldots, x_n\}$, $\{y_1, \ldots, y_i, \ldots y_n\}$ of numbers x and y in the factorization base by a residue number system. This factorization is performed (blocks 2 and 3, BT) before introduction of the numbers into the actual algorithm 1, based on a base $\{m_1, \ldots, m_i, \ldots m_n\}$ of numbers prime to one another, where n represents the number of base elements which corresponds to the number of elements of the factorization sequences of numbers x and y.

Algorithm 1, that is, the processing block, provides the result in the form of a sequence of integers $\{r_1, \ldots, r_i, \ldots, r_n\}$. This sequence of n numbers is, in this example, recombined (block 4, IBT) based on the same base $\{m_1, \ldots, m_i, \ldots, m_n\}$ of prime numbers to obtain result r.

According to the present invention, factorization base $\{m_1, \ldots, m_i, \ldots, m_n\}$ is provided by an element 5 (SELECT{M}) of selection and temporary storage of the sequence of numbers (or polynomials) prime to one another of residue number system factorization. This selection is, preferably, changed for each application of algorithm 1, that is, for each new introduction of values x, y (each time it is necessary to factorize values to be taken into account by the algorithmic calculation to obtain a result recomposed based on the same residue number system). If more than two numbers are used, or if other numbers are involved at other moments in the algorithm, it will be ascertained to maintain a same base for all numbers.

According to the origin and to the destination of the input data of the algorithm, factorizations 2 and 3 may be performed higher upstream, for example, if the input data are outputs of a processing by residue number system. Similarly, the result(s) may be provided in factorized form. Such will in particular be the case if the algorithm having its execution masked by the present invention is interleaved in a processing chain using a residue number system. In this case, blocks 2, 3, and 4 execute base changes to convert the input data shown in a given factorization base into a base selected by element 5 and to restore the output data in the input base.

According to another embodiment, base changes (additional or not) may be performed during the algorithm. These changes are then selected by means of block 5 in the same way as the initial transformation. The restoring of the processed numbers is then obtained by a single reverse transformation performed (not necessarily at the end of the algorithm) according to the last base used.

Several methods may be used to select the factorization base or to change bases during the calculation.

According to a first implementation mode, a table of sets {M} of numbers prime to one another is stored in a storage element and a selection (for example, random) of one of the sets of the stored table is provided for each new factorization, each set representing a base in the residue number system.

According to another example of implementation, a generator of sequences of numbers prime to one another which generates (on the fly), pseudo-randomly to be compatible with the parallel architecture of the circuit executing algorithm 1, factorization base $\{m_1, \ldots, m_i, \ldots, m_n\}$ is used.

It should be noted that, for the factorization or the base change to be different from one calculation to another, it is enough for two numbers of the chosen factorization base to be inverted, that is, placed in a different order in the base number sequence. It is accordingly particularly simple to vary the factorization of any input digital datum while remaining compatible with a same circuit of processing by parallel architecture. It is enough to modify the branching of the factorized data according to the order of the numbers (or the polynomials) prime to one another of the base. The transformation mode of the base by change in the order of the numbers thereof however conditions the quality of the random character of the number representation in the residue number system.

An advantage of the present invention is that its implementation is independent from the executed algorithm.

Another advantage of the present invention is that it does not require a specific recalculation after completion of the algorithm to recover the expected number. Indeed, in any structure with an algorithmic processing by application of the Chinese remainder theorem, a step of recombination based on the base of numbers or polynomials prime to one another is provided to restore the result.

An example of an algorithm where the present invention applies is the RSA-type algorithm such as described in article "Modular multiplication and base extension in residue number systems" by J.-C. Bajard, L.-S. Didier and P. Kornerup, published by N. Burgess, report of Arith 15, $15^{th}$ IEEE Symposium on Computer Arithmetics, Vail Colo., USA, June 2001, pages 59-65, which is incorporated herein by reference.

Of course, the present invention is likely to have various alterations, modifications, and improvements which will readily occur to those skilled in the art. In particular, the present invention applies whatever the number of input data of the algorithm and whatever the number of data provided by this algorithm, provided that all input data be factorized based on the same base of numbers or polynomials prime to one another.

Further, the choice of the size of the sets of prime numbers or polynomials forming the factorization base depends on the application and is made conventionally.

Further, the practical implementation of the present invention based on the functional indications given hereabove is within the abilities of those skilled in the art by using known means. The implementation of the present invention may be performed by software or by state machines in wired logic. For example, when implemented by hardware means, factorization or input data base change blocks 2 and 3 may be formed of one or several circuits according to whether the base change is carried out in parallel or successively for the different input data.

Such alterations, modifications, and improvements are intended to be part of this disclosure, and are intended to be within the spirit and the scope of the present invention. Accordingly, the foregoing description is by way of example only and is not intended to be limiting. The present invention is limited only as defined in the following claims and the equivalents thereto.

What is claimed is:

1. A method for masking digital data processed by a circuit executing an encryption algorithm comprising:
    calculating a plurality of factorizations of at least two input data based on a variable factorization base, the variable factorization base being comprised of elements prime to one another;
    performing elementary operations on the plurality of factorizations to calculate a result factorization; and
    combining the result factorization based on the variable factorization base to obtain a result.

2. The method of claim 1, wherein the elements of the variable factorization base are chosen from a look-up table of sets of numbers or polynomials prime to one another.

3. The method of claim 2, wherein the elements of the variable factorization base are randomly selected from the look-up table for each new application of the algorithm.

4. The method of claim 1, wherein the elements of the factorization base are calculated by a pseudo-random generator.

5. The method of claim 1, wherein the elements of the variable factorization base are chosen to be compatible with the input data.

6. The method of claim 1, wherein the at least two input data are at least two factorizations calculated based on a different factorization base, and wherein the result is a factorization in the different factorization base.

7. The method of claim 6, wherein the different factorization base is a variable factorization base.

8. The method of claim 1, wherein the at least two input data are not yet factorized.

9. The method of claim 1, wherein the at least two input data are at least two integers.

10. A circuit comprising:
    a circuit to select a variable factorization base, the variable factorization base being comprised of elements prime to one another;
    at least one circuit to calculate factorizations of input data based on the variable factorization base;
    a circuit to perform elementary operations on the factorizations to calculate a result factorization;
    a circuit to combine the result factorization based on the variable factorization base to obtain a result.

11. The circuit of claim 10, wherein the circuit to select a variable factorization base comprises a memory to store a look-up table of sets of numbers or polynomials prime to one another from which the elements of the variable factorization base are selected.

12. The circuit of claim 10, further comprising a circuit for confirming that the variable factorization base is compatible with the input data.

13. The method of claim 10, wherein the circuit to select a variable factorization base comprises a pseudo-random generator.

14. A circuit comprising:
    means for selecting a variable factorization base, the variable factorization base being comprised of elements prime to one another;
    at least one circuit to calculate factorizations of input data based on the variable factorization base;
    a circuit to perform elementary operations on the factorizations to calculate a result factorization; and a circuit to combine the result factorization based on the variable factorization base to obtain a result.

15. The circuit of claim 14, wherein the means for selecting comprises a means for storing a look-up table of sets of numbers or polynomials prime to one another from which the elements of the factorization base are selected.

16. The circuit of claim 14, wherein the means for selecting comprises means for pseudo-randomly generating the elements of the variable factorization base.

* * * * *